US009988791B2

(12) United States Patent
Uji et al.

(10) Patent No.: US 9,988,791 B2
(45) Date of Patent: Jun. 5, 2018

(54) OUTPUT CHARACTERISTIC CHANGING SYSTEM FOR CONSTRUCTION MACHINE

(71) Applicant: HITACHI CONSTRUCTION MACHINERY CO., LTD., Tokyo (JP)

(72) Inventors: Katsumasa Uji, Tsukuba (JP); Yuuichirou Morita, Hitachi (JP); Kouichi Shibata, Kasumigaura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 0 days. days.

(21) Appl. No.: 15/554,793

(22) PCT Filed: Mar. 31, 2016

(86) PCT No.: PCT/JP2016/060696
§ 371 (c)(1),
(2) Date: Aug. 31, 2017

(87) PCT Pub. No.: WO2017/168687
PCT Pub. Date: Oct. 5, 2017

(65) Prior Publication Data
US 2018/0106016 A1    Apr. 19, 2018

(51) Int. Cl.
*E02F 9/20* (2006.01)
*E02F 9/26* (2006.01)
(Continued)

(52) U.S. Cl.
CPC ........ *E02F 9/2012* (2013.01); *B60R 16/0234* (2013.01); *E02F 9/2025* (2013.01);
(Continued)

(58) Field of Classification Search
CPC . E02F 9/2012; E02F 9/22; E02F 9/268; E02F 9/2025; E02F 9/2292; E02F 9/2296; E02F 9/24; B60R 16/0234; G07C 5/006
(Continued)

(56) References Cited

U.S. PATENT DOCUMENTS 6,148,258 A * 11/2000 Boisvert ............... F02P 19/022
                                                    123/145 A
8,417,412 B2 * 4/2013 Tominaga ............ G07C 5/0808
                                                    701/31.4
(Continued)

FOREIGN PATENT DOCUMENTS

JP     09-069002 A     3/1997
JP     2004-054823 A   2/2004
(Continued)

OTHER PUBLICATIONS

International Search Report of PCT/JP2016/060696 dated Jul. 5, 2016.

*Primary Examiner* — Ali Neyzari
(74) *Attorney, Agent, or Firm* — Mattingly & Malur, PC

(57) ABSTRACT

A management server (32) is provided in a position away from a hydraulic excavator (1). An operator ID and a vehicle body ID and output characteristic information are stored in a memory device (32A) in the management server (32) in such a manner as to be associated with operability desired by each of operators. The management server (32) extracts the output characteristic information in conformity with the operability desired by an operator from the operator ID and the vehicle body ID, and outputs the extracted output characteristic information to the hydraulic excavator (1). A control device (17) in the hydraulic excavator (1) changes the output characteristics of hydraulic actuators (4D), (4E), (4F), (2B), (3B) based upon the output characteristic information stored in a memory (19).

7 Claims, 9 Drawing Sheets

(51) Int. Cl.
*E02F 9/24* (2006.01)
*B60R 16/023* (2006.01)
*E02F 9/22* (2006.01)

(52) U.S. Cl.
CPC .......... *E02F 9/2292* (2013.01); *E02F 9/2296* (2013.01); *E02F 9/24* (2013.01); *E02F 9/268* (2013.01); *E02F 9/22* (2013.01)

(58) Field of Classification Search
USPC ........................................................ 340/4.36
See application file for complete search history.

(56) References Cited

U.S. PATENT DOCUMENTS

| | | | | |
|---|---|---|---|---|
| 9,109,347 B2* | 8/2015 | Gotou | ................... | E02F 9/205 |
| 9,165,127 B2* | 10/2015 | Miura | ................... | G06F 21/31 |
| 9,725,886 B2* | 8/2017 | Sugiura | ................. | E02F 9/268 |

FOREIGN PATENT DOCUMENTS

| | | | |
|---|---|---|---|
| JP | 2006-297959 A | 11/2006 | |
| JP | 2009-235716 A | 10/2009 | |
| JP | 2010-007266 A | 1/2010 | |
| JP | 2013-023983 A | 2/2013 | |

* cited by examiner

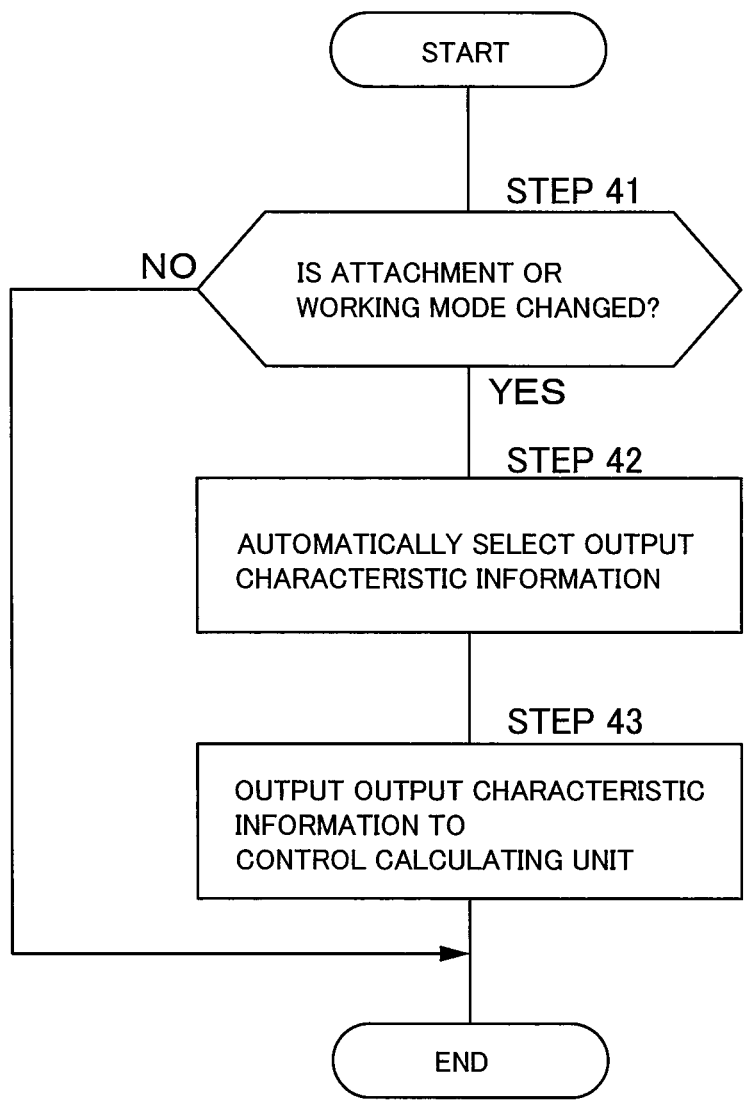

OUTPUT CHARACTERISTIC CHANGING SYSTEM FOR CONSTRUCTION MACHINE

TECHNICAL FIELD

The present invention relates to an output characteristic changing system for a construction machine that changes an output characteristic of an actuator in the construction machine.

BACKGROUND ART

For example, there is known a construction machine as a hydraulic excavator having the configuration that a hydraulic pump is driven by an engine by using fuel of gasoline, light oil or the like as a power source to generate hydraulic pressures, thus driving hydraulic actuators such as hydraulic motors and hydraulic cylinders (for example, refer to Patent Document 1 and Patent Document 2). The hydraulic actuator is small in size and light in weight and is capable of producing large output, which is widely used as an actuator in the construction machine.

In this case, a revolving movement of an upper revolving structure, a traveling movement of a lower traveling structure and movements of working elements such as a boom, an arm and a bucket and the like in the construction machine are determined based upon predetermined operating characteristics in response to operating amounts of operating devices such as levers and pedals and the like by an operator.

Incidentally, there are some cases where in the construction machine, an identical vehicle body is used by many operators. In a case where the operating characteristic of the construction machine is constant, there is a possibility that some operator feels that the responsiveness is poor and in reverse, the other feels that the responsiveness is excessively good. From a viewpoint of an operator side, since many operators use a plurality of construction machines depending upon working sites or working contents, when some construction machine differs in operating characteristics from the other construction machine, a working efficiency is possibly worsen.

PRIOR ART DOCUMENT

Patent Document

Patent Document 1: Japanese Patent Laid-Open No. 2010-7266 A
Patent Document 2: Japanese Patent Laid-Open No. Hei 9-69002 A

SUMMARY OF THE INVENTION

Here, Patent Document 1 discloses the configuration of acquiring characteristic information indicative of an output characteristic of an actuator from a mobile medium of a user. In this case, the actuator is controlled in response to an operating amount that is inputted to an operating device of a construction machine such that the output characteristic of the actuator corresponding to the acquired characteristic information is realized.

In addition, Patent Document 2 describes the configuration of performing an operation of a working device based upon operation pattern information preliminarily stored in an IC card in accordance with an operation feeling of each operator or in accordance with a working content. In this case, it is possible to achieve a reduction of fatigue of an operator caused by the work and an improvement on a working efficiency of the operator.

Patent Documents 1 and 2 are configured such that the output characteristic or the operation pattern is stored in the mobile medium such as the IC card and the like, or the output characteristic or the operation pattern is stored in the vehicle body side to perform communications of data between the mobile medium and the vehicle body, thus reflecting the setting.

However, in the construction machines, working contents, working modes, attachments and the like become in a wide range and the identical vehicle body is used by a plurality of operators. Therefore, in case of improving the working efficiency of the construction machine, it is necessary to change the setting of operability in the construction machine in accordance with the working content, the working mode, the attachment, each of the operators and the like. On the other hand, for changing the setting of the operability in accordance with the working content, the working mode, the attachment, each of the operators and the like in the conventional technology, a data volume that is stored in the mobile medium or the IC card becomes large. Thereby, the mobile medium and a memory device in the construction machine are possibly large-sized or increased in number.

An object of the present invention is to provide an output characteristic changing system for a construction machine that can change an output characteristic of an actuator in each of construction machines while suppressing a mobile medium or a memory device in the construction machine from being large-sized or increased in number.

In order to solve the above-mentioned problems, the present invention is applied to an output characteristic changing system for a construction machine comprising a control device that controls equipment for driving an actuator in construction machine and can change an output characteristic of the actuator incorporated in the control device to be adjusted to each of operators of the construction machine, characterized in that: a management server is provided in a position away from the construction machine, the management server including: a server-side memory part that stores operator information assigned to each of the operators of the construction machine, vehicle body information assigned to respective construction machines, and output characteristic information of the actuator in such a manner as to be associated with operability desired by each of the operators; an information extraction part that, in a case where the operator information and the vehicle body information are transmitted from the control device in the construction machine, extracts the output characteristic information in conformity with the operability desired by the operator from the operator information and the vehicle body information from the server-side memory part; and a server-side transmission part that transmits the output characteristic information extracted from the information extraction part toward the control device in the construction machine.

With this arrangement, it is possible to change the output characteristic of the actuator in the construction machine while suppressing the mobile medium or the memory device in the construction machine from being large-sized or increased in number.

BRIEF DESCRIPTION OF THE DRAWINGS

FIG. 9 is a flow chart showing processing (automatic changing processing of an output characteristic) of the control device in the hydraulic excavator.

MODE FOR CARRYING OUT THE INVENTION

Hereinafter, an output characteristic changing system for a construction machine according to an embodiment of the present invention will be in detail explained with reference to the accompanying drawings, by taking a case of being applied to an output characteristic changing system for a hydraulic excavator as an example.

Figure 1:
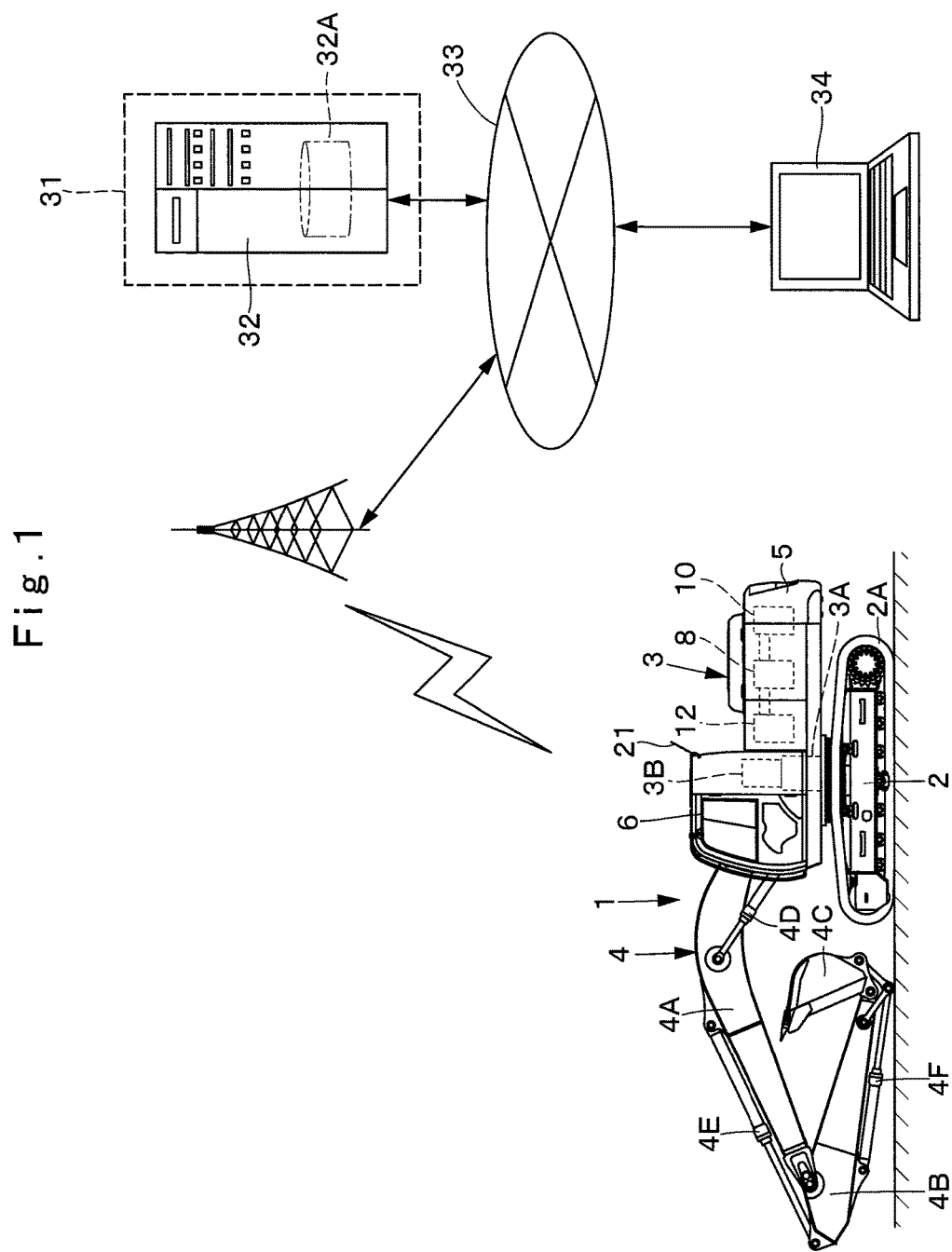
FIG. 1 is a schematic diagram showing an output characteristic changing system for a hydraulic excavator according to an embodiment.

In FIG. 1, a hydraulic excavator 1 as a representative example of construction machines operates in a working site (construction site) of a civil engineering work, a construction work, a demolition work, a dredging work, and the like. In FIG. 1, for simplification in drawing, only one hydraulic excavator 1 is shown, but in fact, a plurality of hydraulic excavators 1 operate in various working sites.

The hydraulic excavator 1 includes an automotive lower traveling structure 2 of a crawler type, an upper revolving structure 3 that is rotatably mounted on the lower traveling structure 2 and configures a vehicle body together with the lower traveling structure 2, and a working mechanism 4 that is tiltably provided in the front side of the upper revolving structure 3. The hydraulic excavator 1 can perform an excavating work of earth and sand, and the like by using the working mechanism 4.

Here, the lower traveling structure 2 includes, for example, crawler belts 2A and left and right traveling hydraulic motors 2B (refer to FIG. 2) that cause the hydraulic excavator 1 to travel by revolving the crawler belts 2A. On the other hand, the upper revolving structure 3 includes a revolving mechanism 3A that rotatably supports the upper revolving structure 3 to the lower traveling structure 2, a revolving hydraulic motor 3B that revolves the upper revolving structure 3 through the revolving mechanism 3A, a counterweight 5 for acting as a weight balance to the working mechanism 4, a cab 6, an engine 8, a hydraulic pump 10, a control valve 12 and a control device 17.

The working mechanism 4 includes, for example, a boom 4A, an arm 4B, a bucket 4C as an attachment (working tool), and a boom cylinder 4D, an arm cylinder 4E and a bucket cylinder 4F as a working tool cylinder for driving them. The boom cylinder 4D, the arm cylinder 4E and the bucket cylinder 4F composed of these hydraulic cylinders, and the left and right traveling hydraulic motors 2B and the revolving hydraulic motor 33 composed of the hydraulic motors act as hydraulic actuators that are respectively driven based upon supply of the pressurized oil. It should be noted that in FIG. 2, the boom cylinder 4D, the arm cylinder 4E and the bucket cylinder 4F are expressed as one hydraulic cylinder for avoiding complication in drawing. In addition, the left and right traveling hydraulic motors 2B and the revolving hydraulic motor 3B are expressed as one hydraulic motor.

The cab 6 defines an operating room and is provided on a front left side of the upper revolving structure 3. An operator's seat (not shown) on which an operator sits is provided in the cab 6. Moreover, an operating lever/pedal device for traveling and an operating lever device (hereinafter, referred to as "lever device 7") for working are provided on the periphery of the operator's seat. The lever device 7 outputs a pilot signal (pilot pressure) in response to a tilting operation of the operating lever by an operator to the control valve 12. Further, the control device 17 to be described later is provided in a rear lower side of the operator's seat in the cab 6, for example.

The engine 8 is disposed in a horizontal state in front side of the counterweight 5. The engine 8 is configured of an internal combustion engine of, for example, a diesel engine and the like as equipment that drives the hydraulic actuators 4D, 4E, 4F, 2B, 3B. The hydraulic pump 10 is attached on one side in the left-right direction (for example, the right side) of the engine 8. Here, the engine 8 is configured of an electronically controlled engine, and a supply amount of fuel is variably controlled by a fuel injection device (not shown) including an electronically controlled injection valve, for example.

That is, the fuel injection device variably controls an injection amount of fuel (fuel injection amount) to be injected into cylinders (not shown) of the engine 8 based upon a control signal outputted from an engine controller 9. The engine controller 9 is connected to the control device 17 to be described later, more specifically, an engine control calculating part 16A of a control calculating unit 16. The engine controller 9 controls a rotational speed of the engine 8 based upon a command signal from the control calculating unit 16.

The hydraulic pump 10 is driven by the engine 8. The hydraulic pump 10 configures a hydraulic source together with a hydraulic oil tank 11. The hydraulic pump 10 acts as a power source for driving various hydraulic actuators (the left and right traveling hydraulic motors 2B and the revolving hydraulic motor 3B, and the respective cylinders 4D, 4E, 4F and the like) mounted on the hydraulic excavator 1. That is, the hydraulic pump 10 configures the equipment for driving the hydraulic actuators 4D, 4E, 4F, 2B, 3B. The hydraulic pump 10 increases a pressure of the hydraulic oil in the hydraulic oil tank 11 to be delivered to the control valve 12.

The hydraulic pump 10 is configured as a variable displacement hydraulic pump such as a swash plate type, a radial piston type or a bent axis type, for example. That is, the hydraulic pump 10 includes a displacement variable part 10A composed of a swash plate or a bent axis and the like, and a displacement variable mechanism (regulator) 10B that drives the displacement variable part 10A.

The displacement variable mechanism 10B drives (tilts) the displacement variable part 10A based upon a command of a pump control calculating part 16C in the control calculating unit 16 to be described later. As a result, a tilting angle of the displacement variable part 10A changes, making it possible to increase/decrease a pump displacement of the hydraulic pump 10.

The control valve 12 is a control valve device composed of a collector of a plurality of directional control valves. The control valve 12 controls directions of the pressurized oil to be delivered to the various hydraulic actuators 4D, 4E, 4F, 2B, 3B from the hydraulic pump 10 in response to an operation of the lever device 7 arranged in the cab 6. Thereby, the hydraulic actuators 4D, 4E, 4F, 2B, 3B are driven by the pressurized oil to be delivered from the hydraulic pump 10. That is, the control valve 12 configures the equipment that drives the hydraulic actuators 4D, 4E, 4F, 2B, 3B in the same way as the engine 8 and the hydraulic pump 10.

Sensors 13 are detectors that detect state amounts of respective components of the hydraulic excavator 1, and are connected to the control calculating unit 16 in the control device 17. The sensors 13 are configured of various sensors that detect a pressure (cylinder pressure) of each of the cylinders 4D, 4E, 4F, a pressure (delivery pressure) of each of the hydraulic pumps 10 and the like, an oil temperature sensor that detects a temperature of hydraulic oil (oil temperature), a pressure sensor that detects a pilot pressure outputted from the lever device 7 or a displacement sensor that detects a displacement amount of a lever of the lever device 7, and the like, for example. Detection signals corresponding to the state amounts (state amounts changing with the working of the hydraulic excavator 1) of the pressure, the temperature and the like, and the lever operating amount of the lever device 7, which are detected by the sensors 13, are outputted to the control calculating unit 16.

A switch 14 configures a function setting switch that switches an operating state of the hydraulic excavator 1, and is connected to the control calculating unit 16 in the control device 17. The switch 14 includes various kinds of switches of, for example, a power mode switch that switches a power mode of the hydraulic excavator 1, a power digging switch that temporarily increases engine output, an automatic idling switch that switches an automatic idling function, an idling stop switch that switches an idling stop function and a traveling mode switch that switches a traveling mode of the hydraulic excavator 1. The function setting of the hydraulic excavator 1 switched by the switch 14 is outputted to the control calculating unit 16 and is reflected on control of various kinds of equipment mounted on the hydraulic excavator 1. Here, the power mode includes, for example, an eco-mode for achieving energy saving of the hydraulic excavator 1, a standard power mode that increases a working amount (output) of the hydraulic excavator 1 more than the eco-mode and a high power mode that further increases the working amount of the hydraulic excavator 1.

An engine control dial 15 is provided near the operator's seat, and is connected to the control calculating unit 16 in the control device 17. The engine control dial 15 adjusts a command value of the rotational speed of the engine 8, and is operated by an operator of the hydraulic excavator 1. The command value of the engine control dial 15 is inputted to the engine control calculating part 16A in the control calculating unit 16.

The control calculating unit 16 performs control of various kinds of equipment which are mounted on the hydraulic excavator 1, such as the engine 8, the hydraulic pump 10, the control valve 12, an electromagnetic valve which is not shown and the like. That is, the control calculating unit 16 performs the control of the various kinds of equipment mounted on the hydraulic excavator 1 to determine output characteristics of the hydraulic actuators 4D, 4E, 4F, 2B, 3B in the hydraulic excavator 1. The control calculating unit 16 is configured of, for example, a microcomputer and the like, and includes a CPU (central processor unit) and the like.

Figure 2:
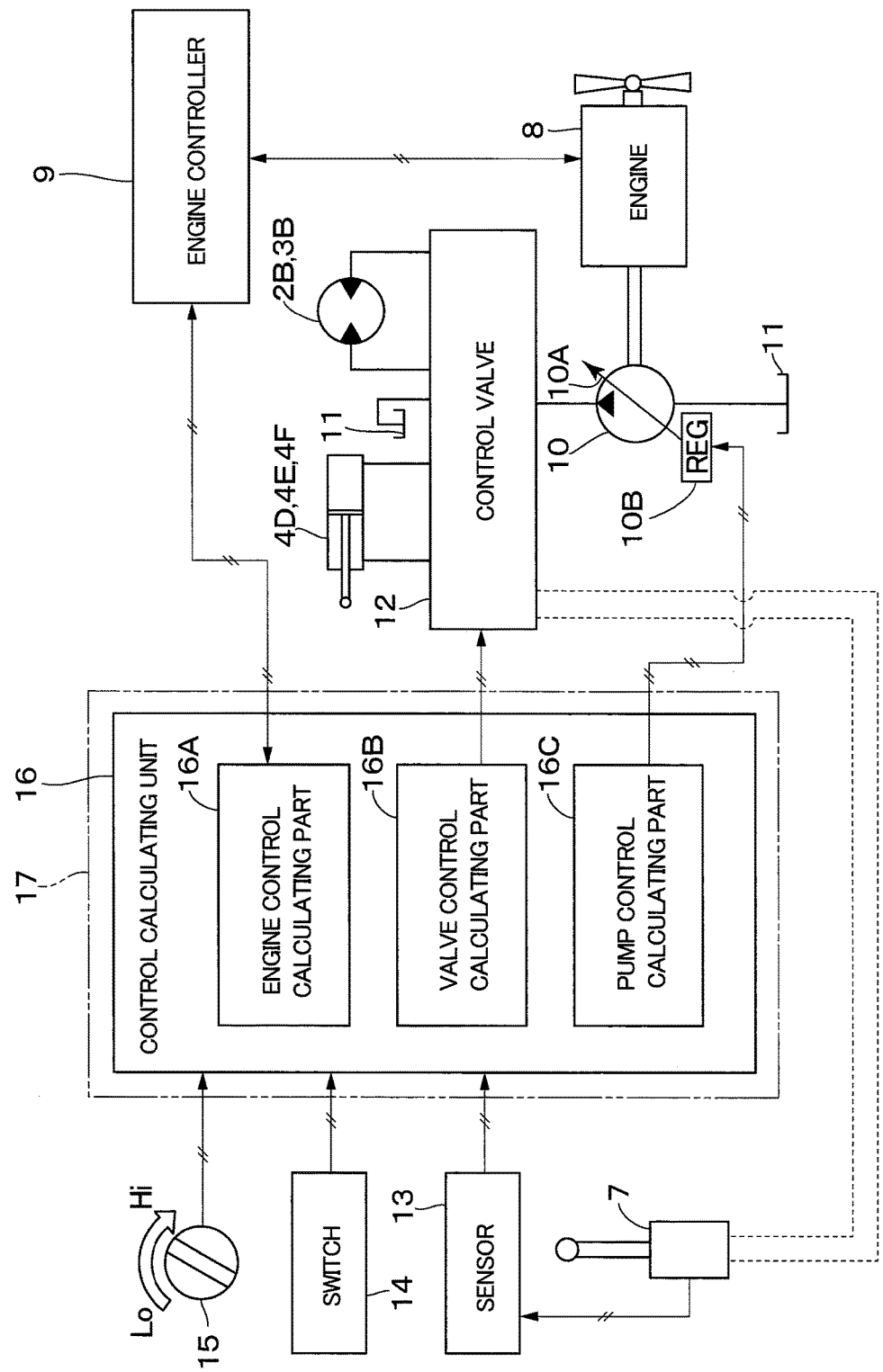
FIG. 2 is a hydraulic circuit diagram of the hydraulic excavator in FIG. 1.

As shown in FIG. 2, the control calculating unit 16 is provided with, for example, the engine control calculating part 16A, a valve control calculating part 16B and the pump control calculating part 16C. In this case, an input side of the control calculating unit 16 is connected to the engine controller 9, the sensors 13, the switches 14, the engine control dial 15, a memory 19 (refer to FIG. 3) to be described later, and the like. On the other hand, an output side of the control calculating unit 16 is connected to the engine controller 9, the hydraulic pump 10, the control valve 12 and the like.

The engine control calculating part 16A calculates a target engine rotational speed based upon a command value of the engine control dial 15, an operating situation of the lever device 7 by an operator, loads of the hydraulic pump 10 and the like. The engine control calculating part 16A outputs a command signal corresponding to the calculated target engine rotational speed to the engine controller 9. The engine controller 9 controls the rotational speed of the engine 8 to reach the target engine rotational speed. The engine control calculating part 16A performs the control according to a control program and a control parameter for engine control incorporated in the control calculating unit 16. In this case, the control program and the control parameter for engine control become output characteristics for determining the output (rotational speed, torque and the like) of the engine 8. Further, the output characteristic of the engine 8 is one factor of output characteristics for determining the output (delivery flow amount) of the hydraulic pump 10, and consequently, the output (expansion/contraction force, rotational force and the like) of the hydraulic actuators 4D, 4E, 4F, 2B, 3B. As described later, the control program and the control parameter for engine control can be changed into a control program and a control parameter for engine control transmitted from a management server 32 to be adjusted to an operator.

The valve control calculating part 16B calculates commands to various kinds of the electromagnetic valves composed of a flow amount control valve, a regeneration control valve and the like based upon the lever operating amount of the lever device 7, a pressure of each of the cylinders 4D, 4E, 4F and a pressure of each of the hydraulic pumps 10 and the like detected by the sensors 13. The electromagnetic valve adjusts the flow amount of the hydraulic circuit including the control valve 12. The valve control calculating part 16B outputs a command signal corresponding to the calculated command value to the electromagnetic valve, and performs the control of the flow amount by the electromagnetic valve. The valve control calculating part 16B performs the control according to control programs and control parameters for valve control incorporated in the control calculating unit 16. In this case, the control program and the control parameter for valve control become output characteristics for determining the flow amount adjustment by the electromagnetic valve. Further, the output characteristic of the electromagnetic valve is one factor of output characteristics for determining the output (expansion/contraction force, rotational force and the like) of the hydraulic actuators 4D, 4E, 4F, 2B, 3B. As described later, the control program and the control parameter for valve control can be changed into a control program and a control parameter for valve control transmitted from the management server 32 to be adjusted to an operator.

The pump control calculating part 16C calculates a command value of a pump torque pressure to be outputted to the displacement variable mechanism 10B of the hydraulic pump 10 to acquire a pump flow amount in accordance with the lever operating amount based upon the lever operating amount of the lever device 7. The pump control calculating part 16C outputs a command signal corresponding to the calculated command value of the pump torque pressure to the displacement variable mechanism 10B of the hydraulic pump 10. The displacement variable mechanism 10B drives the displacement variable part 10A in response to the command signal. The pump control calculating part 16C performs control according to control programs and control parameters for pump control incorporated in the control calculating unit 16. In this case, the control program and the control parameter for pump control become output characteristics for determining the output of the hydraulic pump 10. Further, the output characteristic of the hydraulic pump 10 is one factor of output characteristics for determining the output (expansion/contraction force, rotational force and the like) of the hydraulic actuators 4D, 4E, 4F, 2B, 3B. As described later, the control program and the control parameter for pump control can be changed into a control program and a control parameter for pump control transmitted from the management server 32 to be adjusted to an operator.

Figure 3:
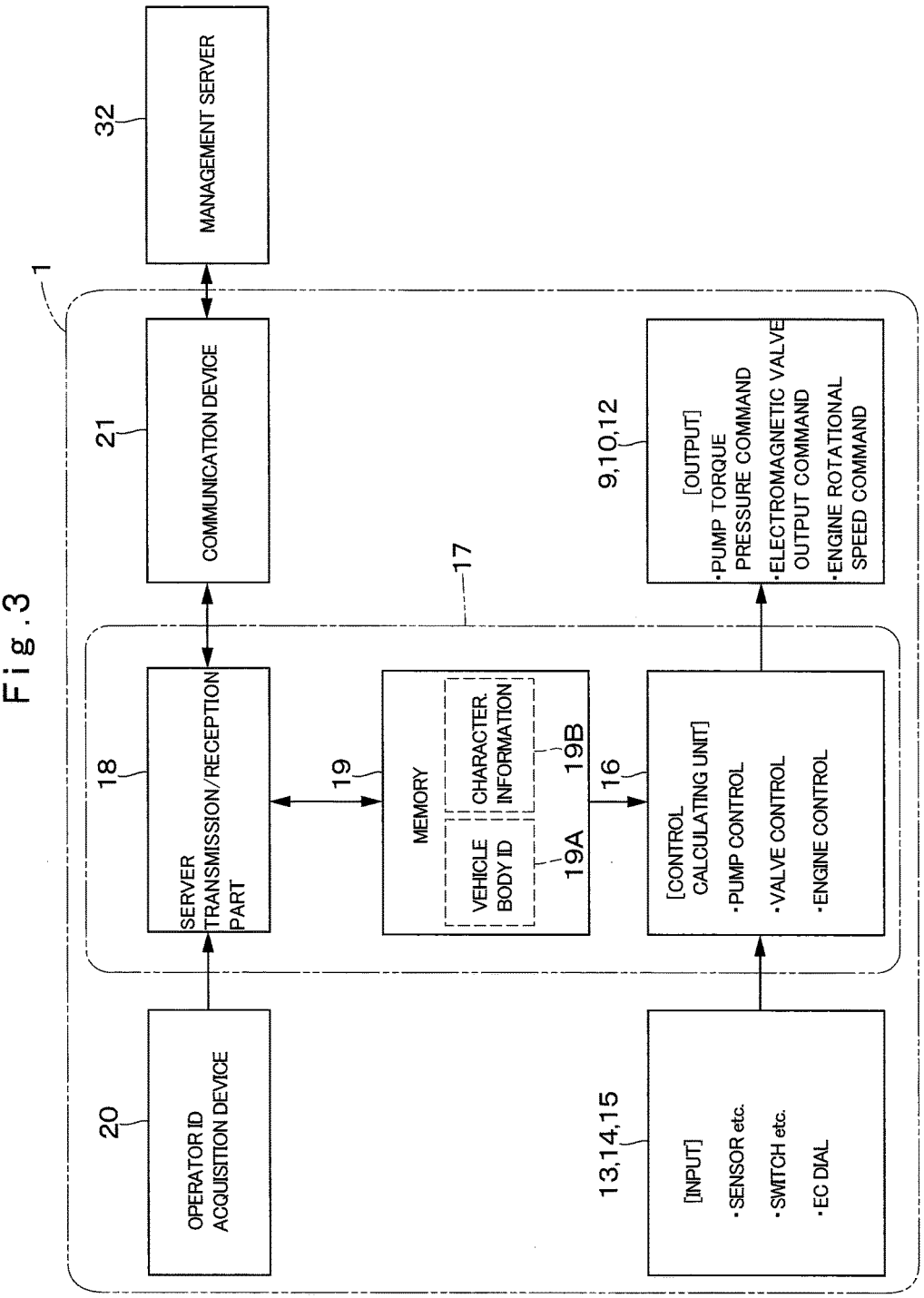
FIG. 3 is a block diagram showing various devices in the hydraulic excavator and a management server in FIG. 1.

Next, an explanation will be made of the control device 17 including the control calculating unit 16 with reference to FIG. 2 and FIG. 3 as well.

The control device 17 in the hydraulic excavator 1 configures the output characteristic changing system for the hydraulic excavator 1. The control device 17 in the hydraulic excavator 1 includes the aforementioned control calculating unit 16, and a server transmission/reception part 18 and the memory 19 to be described later. The control calculating unit 16 in the control device 17 performs control of various kinds of equipment which are mounted on the hydraulic excavator 1, such as the engine 8, the hydraulic pump 10, the control valve 12, the electromagnetic valve and the like. That is, the control calculating unit 16 performs the control of the equipment for driving the hydraulic actuators 4D, 4E, 4F, 2B, 3B of the hydraulic excavator 1.

The server transmission/reception part 18 configures a part (a machine-side transmission part and a machine-side reception part) of the control device 17, and, for example, includes an oscillator, an amplifier and the like. An input side of the server transmission/reception part 18 is connected to the memory 19, an operator ID acquisition device 20 and a communication antenna 21, which will be described later. On the other hand, an output side of the server transmission/reception part 18 is connected to the memory 19 and the communication antenna 21. The server transmission/reception part 18 generates a transmission signal to be transmitted toward the management server 32 to be described later based upon an operator ID acquired in the operator ID acquisition device 20 and a vehicle body ID of the hydraulic excavator 1 stored in the memory 19. In addition, the server transmission/reception part 18 generates a reception signal based upon the output characteristic information of the hydraulic excavator 1 received from the management server 32 to be outputted to the memory 19.

The memory 19 configures apart (machine-side memory part) of the control device 17, and is a memory device including a flash memory, a ROM, a RAM and an EEPROM, for example. An input side of the memory 19 is connected to the server transmission/reception part 18 and an output side of the memory 19 is connected to the control calculating unit 16. The memory 19 includes a vehicle body ID memory part 19A for storing specific vehicle body information (vehicle body ID) assigned for each hydraulic excavator 1 and an output characteristic information memory part 19B for storing the output characteristic information of the hydraulic excavator 1.

Here, the output characteristic information is information for determining the output characteristic of the equipment that drives each of the hydraulic actuators 4D, 4E, 4F, 2B, 3B of the hydraulic excavator 1 by controlling the engine rotational speed, the pump torque pressure, the flow amount adjustment by the electromagnetic valve and the like. Specifically, the output characteristic information includes output characteristics corresponding to the control program and the control parameter for controlling the equipment (the engine 8, the hydraulic pump 10, the control valve 12 and the electromagnetic valve and the like) that drives the hydraulic actuators 4D, 4E, 4F, 2B, 3B of the hydraulic excavator 1 as control targets, output characteristics corresponding to the function setting of the hydraulic excavator 1, and the like. In this case, the output characteristic information memory part 19B in the memory 19 is configured to be capable of storing the output characteristic information of the standard setting to be described later, and besides, the output characteristic information in conformity with a desire of an operator transmitted from the management server 32.

The control program is indicative of the order of commands (procedure of processing and procedure of movements) to the equipment as control targets, for example. In addition, the control parameter corresponds to, for example, output characteristics to the input, such as maps, functions, calculating formulas and the like used at the time of executing control processing of each of the hydraulic actuators 4D, 4E, 4F, 2B, 3B according to the control program (numerical values and characteristics for determining movements).

In addition, the function setting of the hydraulic excavator 1 corresponds to output characteristics to various function settings of the hydraulic excavator 1, such as a function for fixing a working mode of the hydraulic excavator 1 to a predetermined mode, a function for fixing a power mode of the hydraulic excavator 1 to a predetermined mode, a function for fixing a traveling mode of the hydraulic excavator 1 to a predetermined mode, an ON/OFF function of automatic idling, an ON/OFF function of idling stop, a rotational speed upper limit setting function (noise preventing function) for setting an upper limit of the engine rotational speed and an attachment adjusting function and the like, for example.

Here, the working mode of the hydraulic excavator 1 includes working modes corresponding to various kinds of attachments, such as a bucket mode, a breaker mode, a crushing mode, a cutter mode and a fork mode and the like. In this case, each of the working modes includes a working content in which the working is made possible by using each attachment. For example, the working content of the bucket mode includes aground levelling work, an excavating work, a loading work, a crane work and the like.

In addition, the attachment adjusting function is a function that in a case of selecting an attachment other than the bucket 4C in the working mode, the pump flow amount and the like can be adjusted according to preference of an operator. In this case, as described later, these function settings of the hydraulic excavator 1 can be changed into function settings transmitted from the management server 32 to be adjusted to an operator or a manager.

The operator ID acquisition device 20 is provided in the vicinity of the operator's seat, and is configured of, for example, a microcomputer and the like. An output side of the operator ID acquisition device 20 is connected to the server transmission/reception part 18 in the control device 17. The operator ID acquisition device 20 configures an operator information acquisition device that acquires specific operator information (operator ID) assigned to each of operators. In this case, for example, in a case of inserting an ID card in the operator ID acquisition device 20 by an operator, the operator ID acquisition device 20 reads out the operator ID, and transmits the operator ID toward the server transmission/reception part 18. In this case, as described later, the operator ID is transmitted to the management server 32 together with the vehicle body ID. Thereby, the control device 17 can acquire (download) characteristic information (and/or characteristic information corresponding to a function setting desired by a manager) in conformity with operability desired by an operator from the management server 32.

The communication antenna 21 is positioned on an upper surface side of the cab 6, and is configured of a dipole antenna, for example. An input/output side of the communication antenna 21 is connected to the server transmission/reception part 18 in the control device 17. In addition, the input/output side of the communication antenna 21 is connected to the management server 32. The communication antenna 21 configures a communication device that transmits or receives the operator information, the vehicle body information, the output characteristic information and the like between the control device 17 and the management server 32.

Next, an explanation will be made of the management server 32 and the like provided in a position away from the hydraulic excavator 1.

A management center 31 is called a base station, for example, and is installed in a position away from the hydraulic excavator 1, for example, in a main office, a branch office, a factory and the like of a manufacturer of the hydraulic excavator 1. The management center 31 is provided with the management server 32 that stores the output characteristic information of the hydraulic excavator 1. It should be noted that the management center 31 is not limited to the facilities of the manufacturer, and may be installed to, for example, a data center that professionally runs management of the server, and the like.

The management server 32 configures together with the control device 17, an output characteristic changing system that can change the output characteristics of the equipment of the engine 8, the hydraulic pump 10, the control valve 12, the electromagnetic valve and the like incorporated in the control device 17, and consequently, the output characteristics of the hydraulic actuators 4D, 4E, 4F, 2B, 3B to be adjusted to each of operators of the hydraulic excavator 1. The management server 32 is configured of a large-sized computer composed of a server computer, a host computer, a main frame, a general computer and the like, for example. The management server 32 stores the output characteristic information transmitted from the control device 17 in each of the hydraulic excavators 1 as the output characteristic information in each of the hydraulic excavators 1, respectively. Therefore, the management server 32 is provided with a memory device 32A that is composed of a large capacity memory medium of an HDD (hard disc drive) and the like to form a data base.

Figure 4:
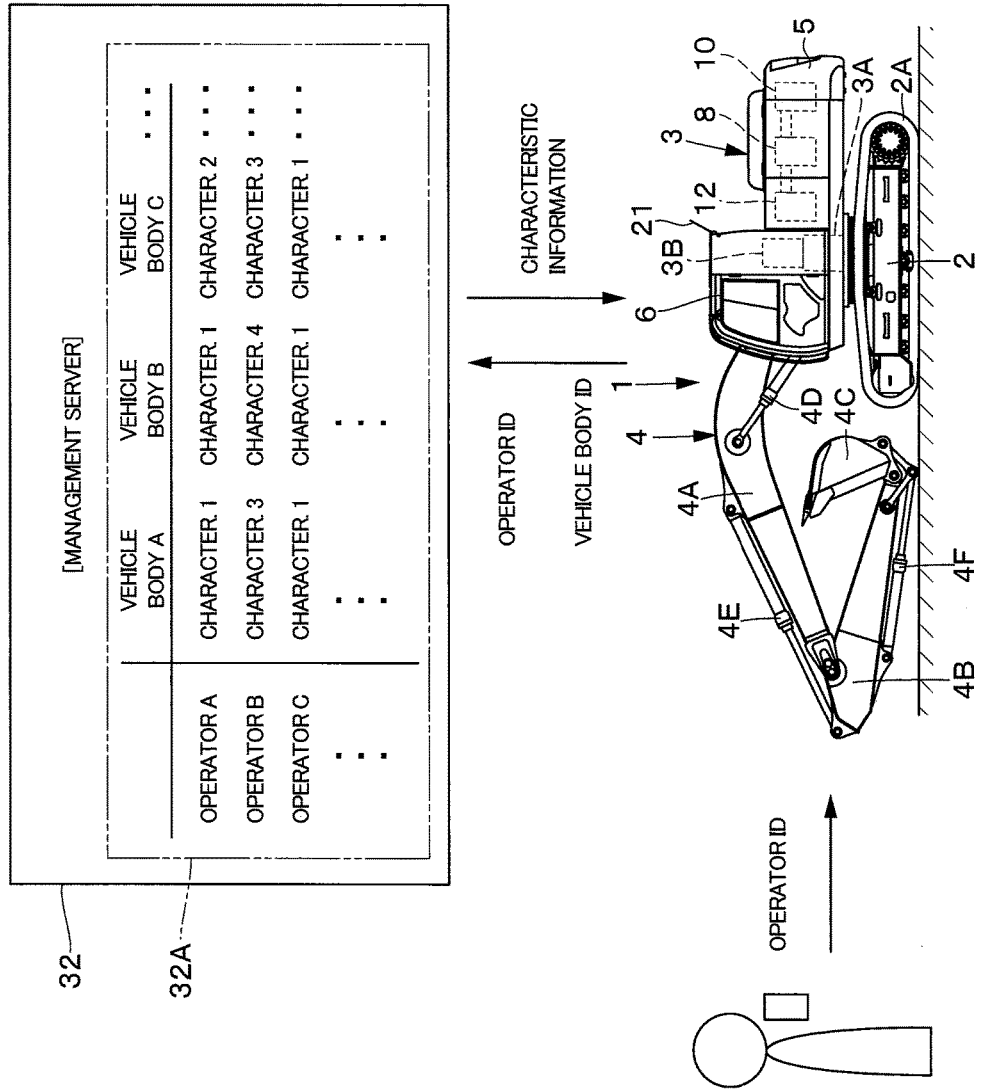
FIG. 4 is an explanatory diagram showing a matrix of the management server in FIG. 1.

The memory device 32A stores the operator ID, the vehicle body ID of the hydraulic excavator 1 and the output characteristic information of the hydraulic actuators 4D, 4E, 4F, 2B, 3B in such a manner as to be associated with the operability desired by each of operators, as a server-side memory part. Specifically, as shown in FIG. 4, the memory device 32A stores combinations of output characteristics desired to respective vehicle bodies A, B, C by respective operators A, B, C . . . as a matrix (table), for example.

In this case, for example, an output characteristic 1 desired to the vehicle body A by the operator A can be registered (stored) in the management server 32 as a front power-oriented characteristic. An output characteristic 2 desired to the vehicle body C by the operator A can be registered in the management server 32 as a front speed-oriented characteristic. In addition, for example, an output characteristic 3 desired to the vehicle body A by the operator B can be registered in the management server 32 as an eco-oriented characteristic. An output characteristic 4 desired to the vehicle body B by the operator B can be registered in the management server 32 as a responsiveness-oriented characteristic. It should be noted that, for example, not only the characteristic in regard to the operability but also the function setting of the hydraulic excavator 1, such as the working mode or the traveling mode can be included in each of the output characteristics 1-4, making it possible to adjust the output characteristic to the finer preference of an operator.

Here, the management server 32 in the management center 31 is connected to, for example, a computer 34 for manager, and the like through a communication line 33 such as a private line, a public line, an Internet line, an optical line, a phone line, a wired line, a wireless line, a satellite line or a mobile line and the like. The management server 32 is connected to the control device 17 in the hydraulic excavator 1 through the communication line 33 and the communication antenna 21. More specifically, the management server 32 is connectable (communication-possible) to the hydraulic excavator 1 through wireless lines of a mobile communication line, a satellite communication line and the like.

The computer 34 for manager is an information terminal for use of a manager of the hydraulic excavator 1, for example. As described later, when the manager changes (updates) or corrects the output characteristic of the hydraulic excavator 1, the manager can determine whether or not the change or the correction is made by using the computer 34 for manager. That is, the output characteristic information of the hydraulic excavator 1 is configured to be changeable or correctable by the manager.

It should be noted that in this case, the computer 34 for manager may be used by persons other than managers, such as an operator of the hydraulic excavator 1, an owner of the hydraulic excavator 1, a service member for maintenance of the hydraulic excavator 1 and the like. In addition, the computer 34 for manager can use various computers and communication equipment when those can be an interface for transmission/reception of data (information) with the management server 32 (and the control device 17 of the hydraulic excavator 1 as needed).

The output characteristic changing system for the hydraulic excavator 1 according to the present embodiment has the configuration as described above, and next, an operation thereof will be explained.

An operator of the hydraulic excavator 1 gets in the cab 6 to activate the engine 8. When the engine 8 is activated, the hydraulic pump 10 is driven by the engine 8. The pressurized oil delivered from the hydraulic pump 10 is delivered toward the various hydraulic actuators 4D, 4E, 4F, 2B, 3B in response to the lever operation of the lever device 7 provided in the cab 6. Thereby, the hydraulic excavator 1 can perform the traveling movement by the lower traveling structure 2, the revolving movement by the upper revolving structure 3, the excavating work by the working mechanism 4, and the like. In this case, in a case where an operator does not particularly designate the operability of the hydraulic excavator 1, the output characteristic of the hydraulic excavator 1 becomes a default as a standard setting.

Here, the standard setting of the hydraulic excavator 1 corresponds to the output characteristic of the default set in a case where an operator does not particularly designate the operability of the hydraulic excavator 1, in a case where the control device 17 cannot authenticate the operator ID, in a case where the communication cannot be established between the control device 17 in the hydraulic excavator 1 and the management server 32, and the like. Specifically, the standard setting indicates a setting that various function settings of the hydraulic excavator 1 are fixed to predetermined functions (for example, a function at the shipment of the hydraulic excavator 1). It should be noted that in a case where the hydraulic excavator 1 is operated in the standard setting, the effect of the standard setting may be informed using a monitor or the like.

Figure 5:
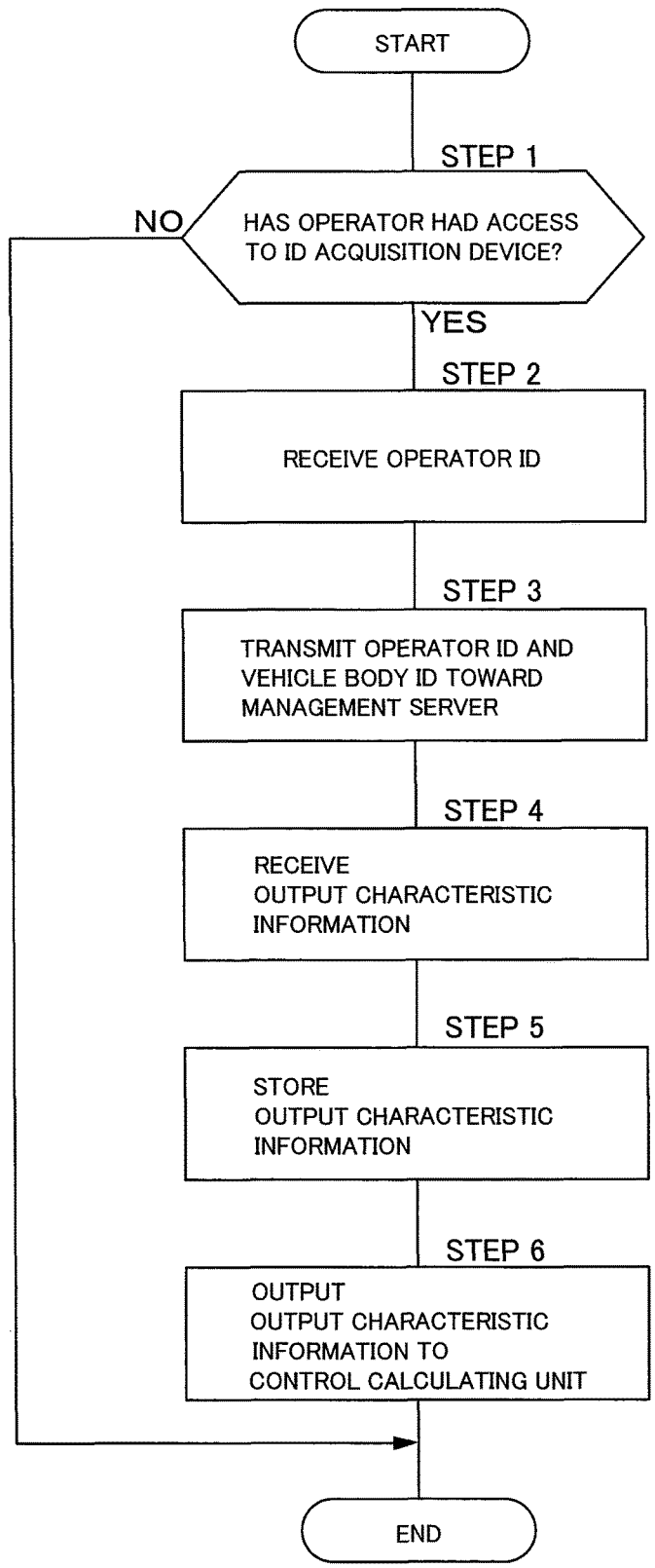
FIG. 5 is a flow chart showing processing (processing of an output characteristic change) of a control device in the hydraulic excavator.

Next, an explanation will be made of the processing in which the control device 17 in the hydraulic excavator 1 changes the output characteristic into an output characteristic in conformity with the operability desired by an operator with reference to FIG. 5.

First, at step 1, the control device 17 determines whether or not an operator has had access to the operator ID acquisition device 20. In this case, for example, the operator ID acquisition device 20 in which the ID card is inserted by an operator reads out the operator ID, and transmits the operator ID toward the server transmission/reception part 18. Thereby, the control device 17 can determine whether or not the operator has had access to the operator ID acquisition device 20 by presence/absence of a transmission signal of the operator ID.

In a case where "NO" determination is made at step 1, since the operator has not had access to the operator ID acquisition device 20, the processing of changing the output characteristic information ends.

On the other hand, in a case where "YES" determination is made at step 1, since the operator has had access to the operator ID acquisition device 20, the process goes to step 2. At step 2, the control device 17 receives the operator ID transmitted from the operator ID acquisition device 20. It should be noted that in this case, the control device 17 may determine whether or not the received operator ID is in conformity with any one of a plurality of operator IDs preliminarily registered, and only in a case of being in conformity with any one thereof, the process goes to step 3 and the subsequent step.

At subsequent step 3, the control device 17 transmits the operator ID and the vehicle body ID toward the management server 32. Specifically, the control device 17 generates transmission signals by using the server transmission/reception part 18 in regard to the received operator ID and the vehicle body ID extracted from the vehicle body ID memory part 19A in the memory 19. Then, the control device 17 transmits the operator ID and the vehicle body ID toward the management server 32 through the communication antenna 21.

At step 4, the control device 17 receives the output characteristic information transmitted from the management server 32 through the communication antenna 21. In this case, the server transmission/reception part 18 in the control device 17 generates a reception signal based upon the output characteristic information of the hydraulic excavator 1 received from the management server 32, and outputs the reception signal toward the memory 19.

At subsequent step 5, the control device 17 stores the output characteristic information received from the management server 32 in the output characteristic information memory part 19B in the memory 19. Specifically, the control device 17 changes the present output characteristic information incorporated in the output characteristic information memory part 19B into new output characteristic information received from the management server 32 for storage. It should be noted that in this case, the control device 17 may newly store only the actually changed information out of the information (for example, the control program, the control parameter, the function setting of the hydraulic excavator 1, and the like) included in the output characteristic information in the output characteristic information memory part 19B.

Then, at step 6, the control device 17 outputs the output characteristic information stored in the output characteristic information memory part 19B in the memory 19 to the control calculating unit 16. The control calculating unit 16 executes calculation processing based upon the output characteristic information that is inputted. Specifically, the control calculating unit 16 executes the calculation processing of the lever operating amount of the lever device 7 based upon the output characteristic information to control the equipment (the engine 8, the hydraulic pump 10, the control valve 12, the electromagnetic valve and the like) that drives the hydraulic actuators 4D, 4E, 4F, 2B, 3B. Thereby, the output characteristics of the hydraulic actuators 4D, 4E, 4F, 2B, 3B are changed into the operability desired by an operator. As a result, even in a case where the same lever operating amount is inputted in the control calculating unit 16 before and after changing the output characteristic information, the output characteristics of the hydraulic actuators 4D, 4E, 4F, 2B, 3B become different values.

It should be noted that in a case where the output characteristic information has a plurality of output characteristics of the hydraulic actuators 4D, 4E, 4F, 2B, 3B, an operator selects one of the plurality of the output characteristics. Specifically, in a case where the output characteristic information has a plurality of output characteristics, those output characteristics are stored in the output characteristic information memory part 19B in the memory 19. An operator operates the monitor (not shown) attached in the hydraulic excavator 1 to select one output characteristic out of the plurality of output characteristics. That is, the output characteristic information can be configured of the plurality of output characteristics selectable in the hydraulic excavator 1-side.

For example, in a case where the output characteristic information has a plurality of output characteristics for each work by the hydraulic excavator 1 and for each attachment mounted on the working mechanism 4, an operator can select one out of the plurality of output characteristics to adjust to the actual work and attachment. As explained specifically, in a case where the hydraulic excavator 1 performs a demolition work by using a crushing machine, an operator can select the output characteristic by which the output of the working mechanism 4 becomes high output and the output characteristic corresponding to the crushing machine.

In addition, in a case where the function setting of the hydraulic excavator 1 is changed in the output characteristic information, the control calculating unit 16 executes the calculating processing based upon the set function to change the output characteristics of the hydraulic actuators 4D, 4E, 4F, 2B, 3B. For example, in a case where the power mode of the hydraulic excavator 1 is set to the eco-mode, the control calculating unit 16 outputs a command of lowering the engine rotational speed. On the other hand, in a case where the power mode of the hydraulic excavator 1 is set to a standard power mode, the control calculating unit 16 outputs a command of increasing the engine rotational speed.

Here, step 3 configures a machine-side transmission part that transmits the operator ID acquired in the operator ID acquisition device 20 and the vehicle body ID to the management server 32 through the communication antenna 21. In addition, step 4 configures a machine-side reception part that receives the output characteristic information transmitted from the management server 32 through the communication antenna 21. In addition, step 5 configures a machine-side memory part that stores the output characteristic information received in the machine-side reception part.

Figure 6:
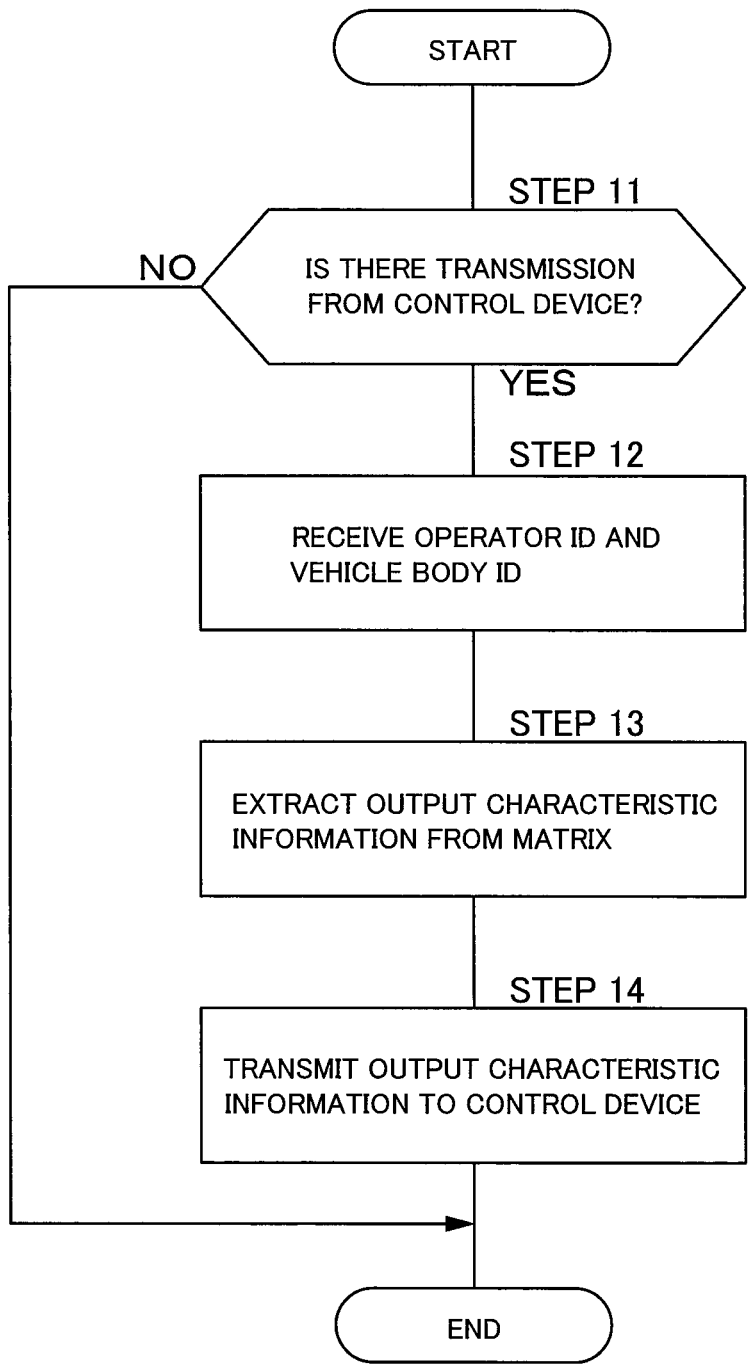
FIG. 6 is a flow chart showing processing (processing of an output characteristic change) of the management server.

Next, an explanation will be made of the processing in which the management server 32 extracts and transmits the output characteristic information in conformity with the operability desired by an operator with reference to FIG. 6.

First, at step 11, the management server 32 determines whether or not the operator ID and the vehicle body ID are transmitted through the communication antenna 21 from the server transmission/reception part 18 in the control device 17.

In a case where "NO" determination is made at step 11, since the operator ID and the vehicle body ID are not transmitted from the control device 17, the processing of extracting the output characteristic information ends.

On the other hand, in a case where "YES" determination is made at step 11, since the operator ID and the vehicle body ID are transmitted from the control device 17, the process goes to step 12. At step 12, the management server 32 receives the operator ID and the vehicle body ID transmitted from the control device 17.

At subsequent step 13, the management server 32 extracts the output characteristic information from the matrix. In this case, the management server 32 manages, as shown by the matrix in FIG. 4, the operator ID and the vehicle body ID in such a manner as to be associated with each other, and uniquely determines the output characteristic by a combination of the operator ID and the vehicle body ID. Specifically, for example, as shown in FIG. 4, in a case where the operator ID corresponds to the operator A and the vehicle body ID corresponds to the vehicle body A, the management server 32 extracts an output characteristic 1 in conformity with the characteristic desired by the operator A from the memory device 32A. In addition, in a case where the operator ID corresponds to the operator B and the vehicle body ID corresponds to the vehicle body B, the management server 32 extracts an output characteristic 4 in conformity with the characteristic desired by the operator B from the memory device 32A.

At step 14, the management server 32 transmits the output characteristic information (for example, the output characteristic 1 or the output characteristic 4) extracted from the memory device 32A toward the control device 17.

Here, step 13 configures, in a case where the operator ID and the vehicle body ID are transmitted from the control device 17 in the hydraulic excavator 1, an information extraction part for extracting the output characteristic information in conformity with the characteristic desired by the operator from the operator ID and the vehicle body ID from the memory device 32A. In addition, step 14 configures a server-side transmission part of transmitting the output characteristic information extracted from the information extraction part toward the control device 17 in the hydraulic excavator 1.

Figure 7:
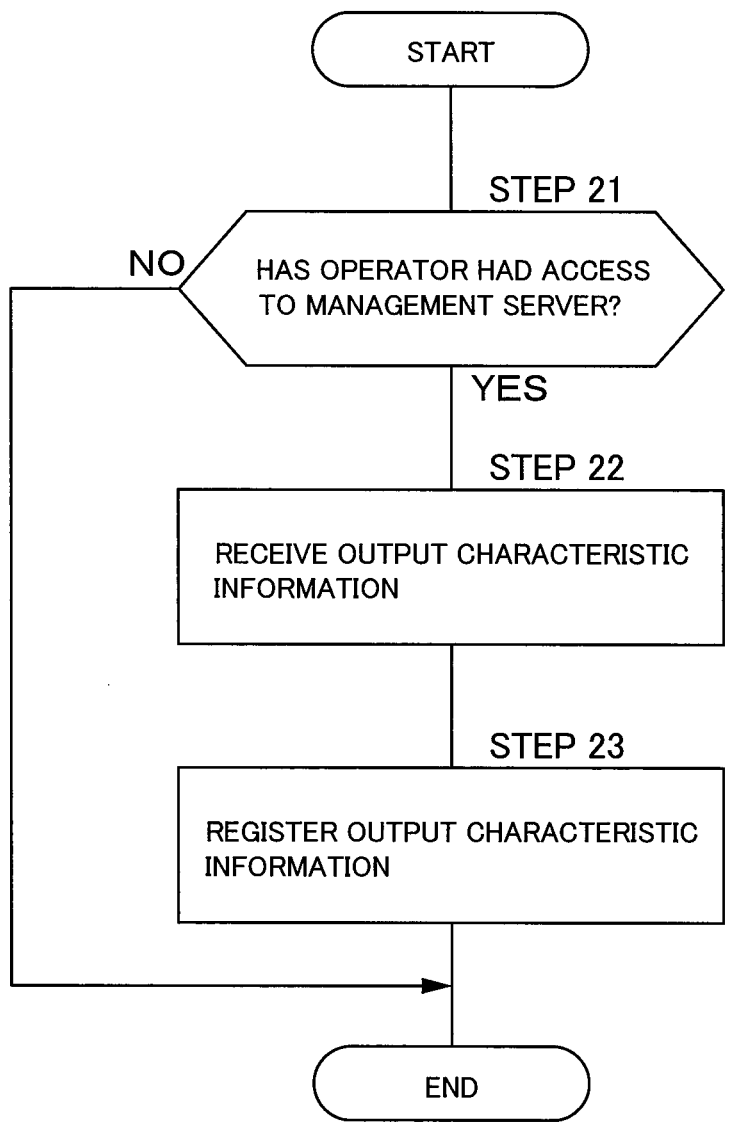
FIG. 7 is a flow chart showing processing (processing of an output characteristic registration by an operator) of the management server.

Next, an explanation will be made of the processing in which an operator registers the output characteristic information in conformity with the output characteristic desired by the operator with reference to FIG. 7.

First, at step 21, the management server 32 determines whether or not an operator has had access to the management server 32. That is, the management server 32 determines whether or not the operator has made communications with the management server 32, by using the operator ID acquisition device 20.

In a case where "NO" determination is made at step 21, since the operator has not had access to the management server 32, the processing of registering the output characteristic information ends.

On the other hand, in a case where "YES" determination is made at step 21, since the operator has had access to the management server 32, the process goes to step 22. At step 22, the management server 32 receives the output characteristic information preliminarily adjusted by the operator. That is, the operator uses the hydraulic excavator 1 to preliminarily adjust the output characteristic information of the hydraulic excavator 1 to the output characteristic information in conformity with the output characteristic desired by the operator. Specifically, for example, an adjusting method of the output characteristic information is implemented such that an operator operates the hydraulic excavator 1 and adjusts setting items by using the monitor (not shown) attached on the vehicle body. In this case, in regard to the output characteristic information, an operator may adjust the setting items by using the computer 34 for manager. Further, the control device 17 in the hydraulic excavator 1 may be configured to store an operating situation or a working content in the hydraulic excavator 1 of the operator to be statically determined, automatically adjusting the setting items of the output characteristic information. Then, the operator transmits the adjusted output characteristic information to the management server 32 through the server transmission/reception part 18 and the communication antenna 21.

At subsequent step 23, the management server 32 registers the received output characteristic information to the memory device 32A. In this case, step 23 configures a server-side memory part that stores the operator ID, the vehicle body ID of the hydraulic excavator 1 and the output characteristic information of the hydraulic actuators 4D, 4E, 4F, 2B, 3B in such a manner as to be associated with the operability desired by each of operators.

Figure 8:
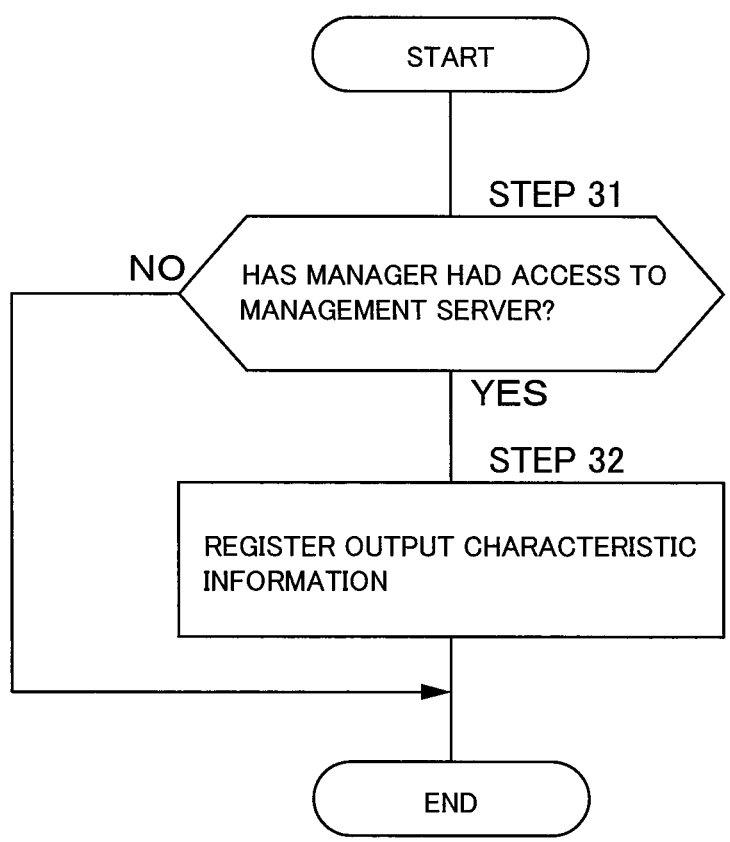
FIG. 8 is a flow chart showing processing (processing of an output characteristic registration by a manager) of the management server.

Next, an explanation will be made of the processing in which a manager registers the output characteristic information in conformity with the output characteristic desired by the manager with reference to FIG. 8.

First, at step 31, the management server 32 determines whether or not a manager has had access to the management server 32. That is, the management server 32 determines whether or not the manager has made communications with the management server 32 by using the computer 34 for manager.

In a case where "NO" determination is made at step 31, since the manager has not had access to the management server 32, the processing of registering the output characteristic information ends.

On the other hand, in a case where "YES" determination is made at step 31, since the manager has had access to the management server 32, the process goes to step 32. At step 32, the management server 32 registers the output characteristic information in the memory device 32A. In this case, the manager changes the output characteristic information of the hydraulic excavator 1 into the output characteristic information in conformity with the output characteristic desired by the manager. Specifically, for example, various function settings of the hydraulic excavator 1, such as always fixing the power mode of the hydraulic excavator 1 to the eco-mode or always turning on the automatic idling function can be registered.

Here, step 32 configures a management characteristic changing part that changes the output characteristic information into the output characteristic information in conformity with the output characteristic desired by the manager of the hydraulic excavator 1. It should be noted that in this case, the output characteristic information registered by the manager may be made to be not able to be changed by the operator. Further, items of the output characteristic information that can be changed by the operator may be made to differ from items of the output characteristic information that can be changed by the manager.

Next, an explanation will be made of the processing in which the control device 17 automatically selects the output characteristic with reference to FIG. 9.

First, at step 41, the control device 17 determines whether or not the attachment or the working mode of the hydraulic excavator 1 is changed. In this case, for example, in a case of changing the attachment from the bucket 4C to the breaker or the like other than the bucket 4C, presence/absence of the change is determined by inputting a signal of the effect that the attachment has changed to the control device 17. In addition, for example, in a case of changing the working mode of the hydraulic excavator 1 from the bucket mode to the breaker mode, presence/absence of the change is determined by inputting a signal of the effect that the working mode has changed to the control device 17.

In a case where "NO" determination is made at step 41, since the attachment or the working mode does not change, the processing of automatically selecting the output characteristic ends.

On the other hand, in a case where "YES" determination is made at step 41, since the attachment or the working mode has changed, the process goes to step 42. At step 42, the control device 17 selects the output characteristic. In this case, the control device 17 automatically selects a specific output characteristic corresponding to the attachment or the working mode of the hydraulic excavator 1 out of a plurality of output characteristics included in the output characteristic information stored in the output characteristic information memory part 19B. Specifically, the output characteristic information stored in the output characteristic information memory part 19B is preliminarily defined to be configured of a bucket output characteristic, a breaker output characteristic, a crushing machine output characteristic, a cutter output characteristic, a fork output characteristic and the like corresponding to the attachment or the working mode. Then, the control device 17 automatically selects the output characteristic corresponding to the attachment or the working mode when the attachment or the working mode changes.

Then, at step 43, the control device 17 outputs the output characteristic information stored in the output characteristic information memory part 19B in the memory 19 to the control calculating unit 16. The control calculating unit 16 executes the calculation processing based upon the output characteristic information that is inputted.

Thereby, for example, in a case where the attachment of the hydraulic excavator 1 changes from the bucket 4C to the breaker, the control calculating unit 16 in the control device 17 sets the engine rotational speed, the pump torque pressure, the flow amount adjustment by the electromagnetic valve, and the like to output characteristics appropriate for operating the breaker. In addition, in a case where the working mode changes from the bucket mode to the breaker mode, the control calculating unit 16 in the control device 17 sets the engine rotational speed, the pump torque pressure, the flow amount adjustment by the electromagnetic valve, and the like to output characteristics appropriate for operating the breaker.

Here, step 42 configures an output characteristic selecting part that automatically selects a specific output characteristic corresponding to the attachment or the working mode of the hydraulic excavator 1 out of a plurality of output characteristics included in the output characteristic information stored in the memory 19.

In this way, according to the embodiment, the management server 32 is provided with the memory device 32A that stores the operator ID, the vehicle body ID and the output characteristics of the hydraulic actuators 4D, 4E, 4F, 2B, 3B in such a manner as to be associated with the operability desired by an operator. Thereby, the management server 32 can store a combination of the operator ID, the vehicle body ID and the output characteristics of the hydraulic actuators 4D, 4E, 4F, 2B, 3B. As a result, it is possible to cause the management server 32 to store many output characteristics while suppressing the mobile medium of an operator or the memory device of the hydraulic excavator 1-side from being large-sized or increased in number.

In addition, the management server 32, when the operator ID and the vehicle body ID are transmitted from the control device 17 in the hydraulic excavator 1, includes an information extraction part that extracts the output characteristic information in conformity with the operability desired by an operator from the operator ID and the vehicle body ID from the memory device 32A. Further, the management server 32 includes the server-side transmission part that transmits the output characteristic information extracted from information extraction part toward the control device 17 in the hydraulic excavator 1.

Thereby, the management server 32 can uniquely determine and extract the output characteristics of the hydraulic actuators 4D, 4E, 4F, 2B, 3B in a combination with the operator ID and the vehicle body ID, by using the information extraction part. Moreover, since the extracted output characteristic information is transmitted toward the hydraulic excavator 1 by the server-side transmission part in the management server 32, the work of individually adjusting the output characteristic of the hydraulic excavator 1 in the operator-side does not become necessary, making it possible to facilitate the work of changing the output characteristic of the hydraulic excavator 1. As a result, the management server 32 can change the operability of the hydraulic excavator 1 to be into conformity with the operability desired by an operator.

In addition, according to the embodiment, the control device 17 in the hydraulic excavator 1 includes the machine-side transmission part that transmits the operator ID acquired in the operator ID acquisition device 20 and the vehicle body ID to the management server 32 through the communication antenna 21, the machine-side reception part that receives the output characteristic information transmitted from the server-side transmission part in the management server 32 through the communication antenna 21 and the machine-side memory part that stores the output characteristic information received in the machine-side reception part.

In this case, the control device 17 can receive the output characteristic information transmitted from the server-side transmission part in the management server 32 in the machine-side reception part, and store the transmitted output characteristic information in the machine-side memory part. Thereby, the control device 17 can change the operability of the hydraulic excavator 1 into the operability desired by an operator by using the output characteristic information stored in the machine-side memory part.

That is, even in a case where one operator uses a plurality of hydraulic excavators 1, it is possible to operate each of the hydraulic excavators 1 with the operability desired by the operator according to each of the hydraulic excavators 1. In addition, even in a case where a plurality of operators use one hydraulic excavator 1, it is possible to operate one hydraulic excavator 1 in accordance with the operability desired by each of the operators. As a result, since each of the operators can operate the hydraulic excavator 1 with the operability adapted to the feeling of the operator, it is possible to enhance the working efficiency of the hydraulic excavator 1.

In addition, according to the embodiment, the output characteristic information to be stored in the server-side memory part in the management server 32 is configured to be changeable or correctable. Thereby, for example, even a person other than the operator, such as a manager, an owner, a serviceman and the like of the hydraulic excavator 1 can change or correct the output characteristic information by using the management server 32. As a result, it is possible to easily manage the output characteristic information of the hydraulic excavator 1 by using the management server 32.

In addition, according to the embodiment, the output characteristic information to be extracted by the information extraction part in the management server 32 is configured of a plurality of output characteristics selectable in the hydraulic excavator 1-side. Thereby, an operator can select the output characteristic in accordance with the attachment or the working mode of the hydraulic excavator 1. As a result, it is possible to easily change the operability of the hydraulic excavator 1 into the operability in conformity with a desire of the operator.

In addition, according to the embodiment, the output characteristic information to be stored in the memory device 32A in the management server 32 includes the output characteristics corresponding to the control parameter to be used for the control of the equipment for driving the hydraulic actuators 4D, 4E, 4F, 2B, 3B and the output characteristics corresponding to the function setting of the hydraulic excavator 1. Thereby, it is possible to cause the output characteristic information to include the output characteristics corresponding to the control parameter according to the preference of each of the operators and the output characteristics corresponding to the function of the hydraulic excavator 1, such as the eco-mode and the like.

In addition, according to the embodiment, the management server 32 includes the management characteristic changing part that changes the output characteristic information into the output characteristic information into conformity with the output characteristic desired by a manager of the hydraulic excavator 1. Thereby, it is possible to change the output characteristic of the hydraulic excavator 1 into not only the output characteristic desired by an operator but also the output characteristic desired by a manager. As a result, it is possible to easily manage the output characteristic of the hydraulic excavator 1.

In addition, according to the embodiment, the control device 17 in the hydraulic excavator 1 includes the output characteristic selecting part that automatically selects a specific output characteristic corresponding to the attachment or the working mode of the hydraulic excavator 1 out of a plurality of output characteristics included in the output characteristic information stored in the machine-side memory part. Thereby, since it is possible to automatically change the output characteristic at the time of changing the attachment or the working mode of the hydraulic excavator 1, it is possible to reduce labors and hours of selecting the output characteristic corresponding to the attachment or the working mode.

It should be noted that the aforementioned embodiment is explained by taking a case where the equipment for driving the hydraulic actuators (the left and right traveling hydraulic motors 2B, the revolving hydraulic motor 3B, each of the cylinders 4D, 4E, 4F, and the like) of the hydraulic excavator 1 includes the engine 8, the hydraulic pump 10, the control valve 12, the electromagnetic valve which is not shown and the like, as an example. However, the present invention is not limited thereto, but the equipment that is controlled by the control device may include various kinds of equipment (various kinds of equipment to be controlled by the control device in which control programs and/or control parameters are incorporated) mounted on the construction machine, other than the above-mentioned equipment.

In addition, the aforementioned embodiment is explained by taking a case where the hydraulic actuators (the left and right traveling hydraulic motors 2B, the revolving hydraulic motor 3B, each of the cylinders 4D, 4E, 4F, and the like) are used as the actuators in the hydraulic excavator 1, as an example. However, the present invention is not limited thereto, but the actuators in the construction machine may include various actuators of, for example, electric actuators and the like other than the hydraulic actuator.

In addition, the aforementioned embodiment is explained by taking a case where the memory 19 includes the vehicle body ID memory part 19A and the output characteristic information memory part 19B, as an example. However, the present invention is not limited thereto, but the vehicle body ID memory part and the output characteristic information memory part may be stored in separate memories respectively.

In addition, the aforementioned embodiment is explained by taking a case where the output characteristic information includes both of the output characteristics corresponding to the control program and the control parameter for controlling the equipment that drives the hydraulic actuators 4D, 4E, 4F, 2B, 3B of the hydraulic excavator 1 as the control targets and the output characteristics corresponding to the function setting of the hydraulic excavator 1, as an example. However, the present invention is not limited thereto, but the output characteristic information may include at least one output characteristic out of the output characteristics corresponding to the control program and the control parameter for controlling the equipment that drives the hydraulic actuators of the hydraulic excavator as the control targets and the output characteristics corresponding to the function setting of the hydraulic excavator.

In addition, the aforementioned embodiment is explained by taking a case where the engine-type hydraulic excavator 1 driven by the engine 8 is used as the construction machine, as an example. However, the present invention is not limited thereto, but the present invention may be applied to a hybrid-type hydraulic excavator that is driven by an engine and an electric motor, and further, an electric hydraulic excavator, for example. In addition, the present invention is not limited to the hydraulic excavator, but may be widely applied to various construction machines such as wheel loaders, hydraulic cranes, dump trucks, and bulldozers and the like.

DESCRIPTION OF REFERENCE NUMERALS

1: Hydraulic excavator (Construction machine)
2B: Traveling hydraulic motor (Actuator)

3B: Revolving hydraulic motor (Actuator)
4C: Bucket (Attachment)
4D: Boom cylinder (Actuator)
4E: Arm cylinder (Actuator)
4F: Bucket cylinder (Actuator)
8: Engine (Equipment)
10: Hydraulic pump (Equipment)
12: Control valve (Equipment)
17: Control device
18: Server transmission/reception part (Machine-side transmission part, Machine-side reception part)
19: Memory (Machine-side memory part)
20: Operator ID acquisition device (Operator information acquisition device)
21: Communication antenna (Communication device)
32: Management server
32A: Memory device (Server-side memory part)

The invention claimed is:

1. An output characteristic changing system for a construction machine comprising a control device that controls equipment for driving an actuator in said construction machine and can change an output characteristic of said actuator incorporated in said control device to be adjusted to each of operators of said construction machine, characterized in that:
a management server is provided in a position away from said construction machine,
said management server including:
a server-side memory part that stores operator information assigned to each of the operators of said construction machine, vehicle body information assigned to respective construction machines, and output characteristic information of said actuator in such a manner as to be associated with operability desired by each of said operators;
an information extraction part that, in a case where said operator information and said vehicle body information are transmitted from said control device in said construction machine, extracts said output characteristic information in conformity with the operability desired by said operator from said operator information and said vehicle body information from said server-side memory part; and
a server-side transmission part that transmits said output characteristic information extracted from said information extraction part toward said control device in said construction machine.

2. The output characteristic changing system for the construction machine according to claim 1, wherein
said construction machine-side includes:
said control device that controls said equipment for driving said actuator;
a communication device that transmits or receives each of said information between said control device and said management server; and
an operator information acquisition device that acquires said operator information assigned to each of said operators, wherein
said control device includes:
a machine-side transmission part that transmits said operator information acquired in said operator information acquisition device and said vehicle body information to said management server through said communication device;
a machine-side reception part that receives said output characteristic information transmitted from said server-side transmission part in said management server through said communication device; and
a machine-side memory part that stores said output characteristic information received in said machine-side reception part.

3. The output characteristic changing system for the construction machine according to claim 1, wherein
said output characteristic information that is stored in said server-side memory part in said management server is changeable or correctable.

4. The output characteristic changing system for the construction machine according to claim 1, wherein
said output characteristic information extracted from said information extraction part in said management server is configured of a plurality of output characteristics selectable in said construction machine-side.

5. The output characteristic changing system for the construction machine according to claim 1, wherein
said output characteristic information that is stored in said server-side memory part in said management server is information including at least one of an output characteristic corresponding to a control parameter for use in control of said equipment for driving said actuator and an output characteristic corresponding to a function setting of said construction machine.

6. The output characteristic changing system for the construction machine according to claim 1, wherein
said management server includes a management characteristic changing part that changes said output characteristic information into output characteristic information in conformity with an output characteristic desired by a manager of said construction machine.

7. The output characteristic changing system for the construction machine according to claim 2, wherein
said control device in said construction machine includes an output characteristic selecting part that automatically selects a specific output characteristic corresponding to an attachment or a working mode of said construction machine out of a plurality of output characteristics included in said output characteristic information stored in said machine-side memory part.

* * * * *